United States Patent
Fredrickson et al.

(10) Patent No.: US 10,528,399 B2
(45) Date of Patent: Jan. 7, 2020

(54) TECHNIQUES FOR FASTER LOADING OF DATA FOR ACCELERATORS

(71) Applicant: International Business Machines Corporation, Armonk, NY (US)

(72) Inventors: Mark S. Fredrickson, Rochester, MN (US); John Borkenhagen, Rochester, MN (US); Michael A. Muston, Olmsted, MN (US); Spencer K. Millican, Rochester, MN (US); John D. Irish, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/862,705

(22) Filed: Jan. 5, 2018

(65) Prior Publication Data

US 2019/0213050 A1  Jul. 11, 2019

(51) Int. Cl.
  *G06F 12/10* (2016.01)
  *G06F 9/50* (2006.01)
  *G06F 12/1045* (2016.01)

(52) U.S. Cl.
  CPC ........ *G06F 9/5083* (2013.01); *G06F 12/1045* (2013.01); *G06F 2212/68* (2013.01)

(58) Field of Classification Search
  CPC . G06F 12/1045; G06F 2212/68; G06F 9/5083
  USPC ........................................ 711/207
  See application file for complete search history.

(56) References Cited

U.S. PATENT DOCUMENTS

| | | | |
|---|---|---|---|
| 5,889,996 A | 3/1999 | Adams | |
| 7,895,151 B2 | 2/2011 | Shau et al. | |
| 8,165,988 B2 | 4/2012 | Shau et al. | |
| 8,572,299 B2 | 10/2013 | Pross et al. | |
| 8,880,862 B2 | 11/2014 | Fallon et al. | |
| 2014/0181394 A1* | 6/2014 | Hum | G06F 12/0824 |
| | | | 711/108 |
| 2015/0268969 A1 | 9/2015 | Fallon et al. | |

(Continued)

OTHER PUBLICATIONS

Cache Coherent Multiprocessor Computer Systems with None Cache Coherent Load/Store Instructions Anonymously; IP.com No. IPCOM000203265D; Jan. 21, 2011.

(Continued)

*Primary Examiner* — Hua J Song
(74) *Attorney, Agent, or Firm* — Patterson + Sheridan, LLP

(57) ABSTRACT

Techniques are disclosed for faster loading of data for hardware accelerators. One technique includes after determining that an accelerator is not ready to perform a workload, identifying data associated with performing the workload and negotiating for the data on behalf of the accelerator. After the negotiation, a cache directory entry associated with the data is marked with a "claimed" state indicating that the accelerator has obtained ownership of the data but does not have possession of the data. After an indication that the accelerator is ready to accept the data for the workload is received, the data is moved from a previous owner that has possession of the data to the accelerator. Another technique includes requesting a processing unit to perform a workload. If the processing unit is not ready to perform the workload, a translation cache used by the processing unit is warmed up by another unit.

15 Claims, 3 Drawing Sheets

(56) References Cited

U.S. PATENT DOCUMENTS

2017/0115881 A1    4/2017   Malkin
2017/0153979 A1    6/2017   Marais et al.

OTHER PUBLICATIONS

Dynamic Result Set Invalidation/Refresh within a Database Accelerator ; Anonymously; IP.com No. IPCOM000240803D; Mar. 4, 2015.
Method for Software-Enforced Strict Processor Affinity to Reduce Coherency Traffic in a Cache-Coherent MP System Anonymously; IP.com No. IPCOM000033803D; Dec. 28, 2004.
"DB2 Analytics Accelerator Loader for z/OS", Information Management for Systemz, IBM Silicon Valley Laboratory—2014 WW Tech Sales Boot Camp, 2014, 43 pp.

* cited by examiner

TECHNIQUES FOR FASTER LOADING OF DATA FOR ACCELERATORS

BACKGROUND

The present disclosure generally relates to hardware accelerators, and more specifically, to techniques for faster loading of data for hardware accelerators.

In some computing systems, external hardware accelerators may be installed (e.g., off-chip) to accelerate various specialized operations, such as graphics processing, encryption and decryption, compression and decompression, massively parallel processing (e.g., big data processing, fluid dynamic simulations, and so on), and other computationally expensive tasks. External hardware accelerators can interface with the processing chip via one or more different types of interfaces, interface protocols, etc. Some hardware accelerator systems, for example, may be designed as an add-on board that interfaces with a processor via a physical bus (e.g., PCI Express). As processes run on these accelerator systems, the accelerator can interface with system memory using direct memory access in which the accelerator directly accesses regions of memory using real (e.g., physical), rather than virtual, addresses.

Some hardware accelerators systems may be designed to interface with system memory using a virtual memory space established by a CPU. A process can attach to the accelerator and create a context, which includes information about the virtual memory space allocated to the process, as well as other information. While the process executes on the accelerator, the accelerator can read from and write to system memory using virtual addresses associated with the virtual memory space in lieu of direct memory access using physical memory addresses.

External hardware accelerators may or may not contain caches that are coherent with the on-chip caches and system memory. To help ensure coherency between the accelerator and the on-chip processors, some computer systems typically use on-chip proxies for cache-coherent off-chip accelerators. For example, the on-chip proxy can be used to represent an off-chip hardware accelerator in any negotiations taking place on the cache coherent system bus. The on-chip proxy can participate in these negotiations in real-time, whereas the connection to the off-chip accelerator may be too slow for the accelerator to personally participate in the cache coherence protocol of the on-chip system bus in an effective manner.

The computing system can enforce cache coherency using a system bus where commands and responses are handled separately from the data movement. The command and snoop busses are used to negotiate for the cache lines, and then, based on the outcome of that negotiation, the actual cache lines are moved on the data sub-bus. Many computer systems use a cache coherency protocol to maintain the state of the cache lines. MESI is one example of such a cache coherency protocol. In MESI, each copy of each cache line is in one of the following states: "Modified (M)," "Exclusive (E)," "Shared (S)" or "Invalid (I)."

Some issues of concern that are associated with using off-chip accelerators typically deal with the amount of time it takes to load the off-chip accelerator with the instructions and/or data it needs (e.g., to accelerate a function or workload). For example, there may be a significant latency experienced by the system when the off-chip accelerator is initializing and/or warming up, switching to a different workload, warming up address translation for the accelerator (or another core), etc.

SUMMARY

One embodiment presented herein includes a method for loading data for a hardware accelerator. The method generally includes, upon determining that the accelerator is not ready to perform a workload, identifying data associated with performing the workload and negotiating for the data on behalf of the accelerator. The method also includes, after the negotiation, marking a cache directory entry associated with the data with a first state indicating that the accelerator has obtained ownership of the data but does not have possession of the data. The method further includes, upon receiving an indication that the accelerator is ready to accept the data for the workload, moving the data from a previous owner that has possession of the data to the accelerator.

One embodiment presented herein includes a method for faster loading of data for a processing unit. The processing unit may be a processor on a computing system or a hardware accelerator coupled to the computing system. The method generally includes requesting the processing unit to perform a workload. The method also includes, upon determining that the processing unit is not ready to perform the workload at a time of the request: determining a set of memory addresses associated with performing the workload, and warming up at least one translation cache used by the processing unit, based on the determined set of memory addresses.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Figure 1:
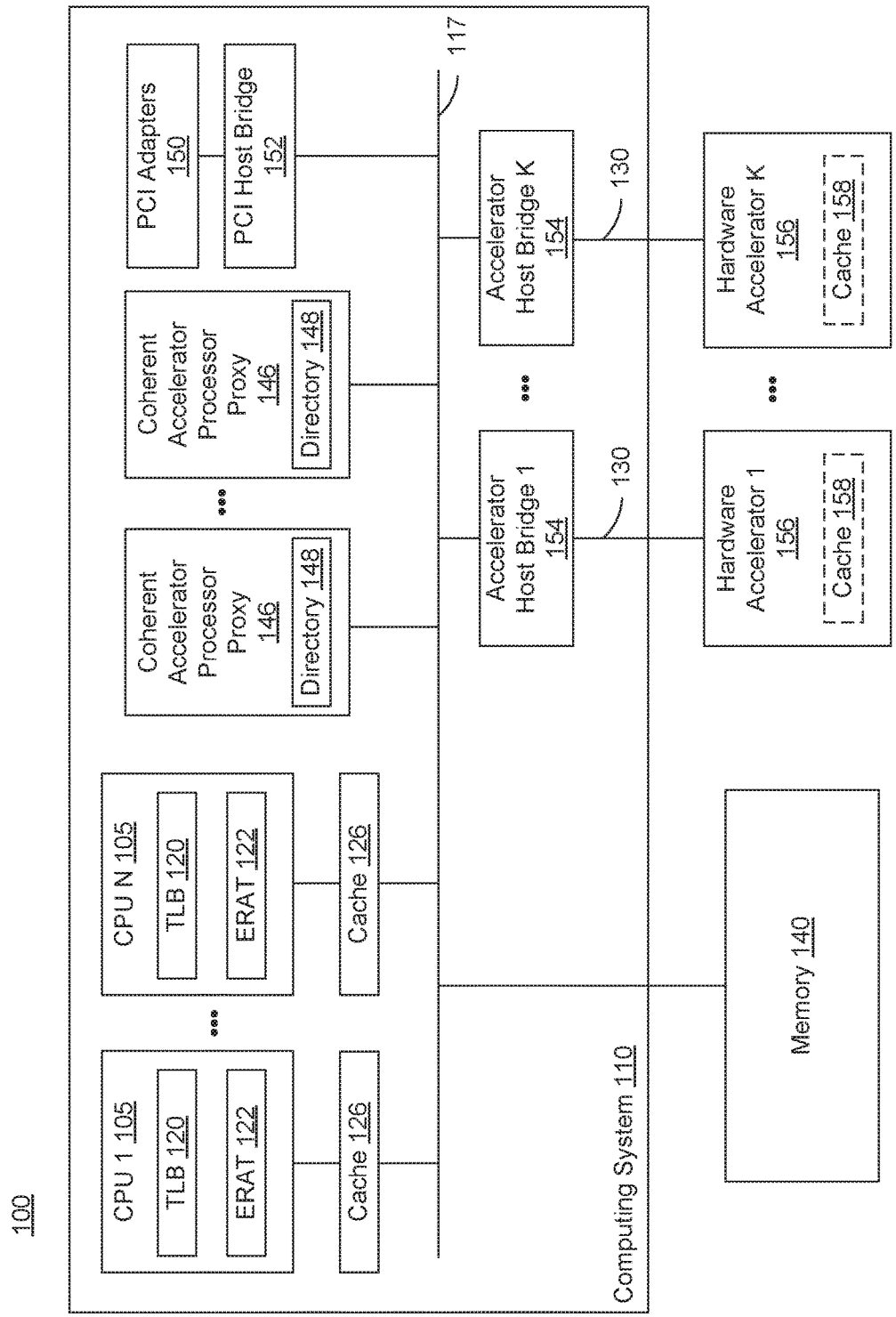
FIG. 1 illustrates an example hardware accelerator system in which a computing system is configured to interface with a hardware accelerator, according to one embodiment.

Embodiments disclosed herein provide techniques that significantly reduce (e.g., relative to traditional techniques) the amount of time it takes to load data on an off-chip hardware accelerator.

For example, one issue associated with the use of off-chip accelerators is the amount of time it takes to initialize an accelerator and prepare (e.g., warm-up) the accelerator for use (e.g., by one of the on-chip processors). The "accelerator initialization time" can take several clock cycles and typically includes actions that have to be done (e.g., generally once) the first time that a specific hardware accelerator is brought on and being prepared for use. Such actions typically include those that are required before the processor can communicate with the accelerator, such as, e.g., FPGA configuration, device discovery, device driver installation, device configuration, etc.

Additionally, or alternatively, the "accelerator warmup time," which typically includes actions that are performed after the processor and accelerator are communicating, can also take several clock cycles. In some cases, the "accelerator warmup time" may be less than the "accelerator initialization time." However, the "accelerator warmup time" generally includes actions that have to be done for each new workload. Examples of such actions can include warming up the address translation (e.g., loading the translation lookaside buffer (TLB) and/or effective to real address translation (ERAT) table, etc.), loading the workload data into the accelerator, etc.

In some cases, the total time required to initialize and/or warmup an accelerator can be a critical element of the overall system performance, e.g., such as in cloud environments or when working on heterogeneous workloads such as cognitive computing. In a public cloud environment, for example, customers generally pay for the CPU time that is used, and therefore, customers may not want to wait for, or pay for, time that is spent waiting for an accelerator to come online.

To reduce the overall time associated with initializing and warming up an off-chip hardware accelerator, embodiments presented herein add a new "claimed" cache state to the cache coherency protocol (e.g., such as the MESI protocol) that can be used by the on-chip proxy when negotiating (e.g., with the on-chip processor(s)) for data that will be needed (e.g., at a future time) by the off-chip hardware accelerator. In one embodiment, the new "claimed" cache state may indicate that a cache line has been "claimed" (e.g., indicating ownership has changed) but that data has not yet been moved to the new owner.

In some cases, for example, the on-chip proxy can detect, e.g., during initialization, warm-up, changing workloads, etc., that an off-chip accelerator will need a particular set of data at a future time. The particular set of data, for example, may be associated with the workload (or function) that the off-chip accelerator is requested to perform. Using the techniques presented herein, the on-chip proxy can be configured to negotiate for the data that will be needed by the off-chip accelerator, while the software is initializing the off-chip accelerator and preparing the off-chip accelerator for work. For example, as the on-chip proxy (via snoop requests/responses) gets permission to use the data, the on-chip proxy can mark the data with the "claimed" cache state to indicate that the data has been claimed by the on-chip proxy, but has not yet been moved from its original location. Thus, when the accelerator is ready to accept the data, the data can be moved directly to the accelerator without having to negotiate for the data at load time.

As such, the "claimed" cache state described herein enables the on-chip proxy to speculatively negotiate and claim data for the off-chip accelerator before the off-chip accelerator is ready for the data and before the data can actually be moved to the off-chip accelerator. Such a speculative negotiation can reduce the overall time associated with initializing and warming up an off-chip hardware accelerator by performing some of the warm-up operations in parallel with (e.g., while still performing) the initialization operations.

Another issue associated with the use of off-chip hardware accelerators is the amount of time it takes to warm up address translation (e.g., TLB, ERAT table, etc.) for an accelerator. For example, many computer systems include address translation and protection services/hardware that translate memory addresses from the programming (e.g., virtual) space to the hardware (e.g., physical) space, keep programs from accessing memory locations that they are not authorized to access, etc. Performing address translation and protection services, however, can take several clock cycles. Thus, to avoid having to pay this penalty every time a program tries to access memory, address translations are typically performed an initial time and stored in an address translation cache, such as a TLB or ERAT table.

In conventional hardware accelerator systems, the address translation (including the memory access authorization and storing of the translations in the address translation cache) is typically performed after the hardware accelerator has come on-line and requested the data associated with the requested workload. However, waiting until the accelerator is on-line before performing address translation can significantly increase the latency associated with using an off-chip accelerator.

As such, to reduce the time associated with warming up address translation caches, embodiments presented herein provide techniques that can be used to pre-emptively warm up address translation for an accelerator (or another unit, such as another on-chip processor core). As described below, while a processor is waiting for an accelerator (or another processor) to be initialized (or warmed up for another workload), the processor can use a new processor bus command that allows the processor to warm up the address translation cache (e.g., TLB, ERAT table, etc.) for another unit (e.g., an off-chip accelerator, another on-chip processor, etc.). By enabling a processor to pre-emptively warm up the address translation for another unit (e.g., before the other unit is ready for the data), the techniques presented herein can significantly reduce the amount of time it takes for the other unit to obtain and start working on the data associated with a given workload.

Note that to clearly point out novel features of the present invention, the following discussion omits or only briefly describes conventional features of information processing systems which are apparent to those skilled in the art. It is assumed that those skilled in the art are familiar with the general architecture of processors, and in particular with processors having two or more processing units each sharing main memory and peripherals (e.g., to simultaneously process programs).

Further, while many of the following embodiments use initialization and warming up of an off-chip hardware accelerator as a reference example of a scenario in which the techniques presented herein can be used to significantly reduce the amount of time it takes to load data for the accelerator, note that the techniques presented herein can be used in other scenarios. Such scenarios may include, but are not limited to, switching from and/or loading a different workload to the hardware accelerator, warming up address translation caches (e.g., translation look-aside buffer (TLB), effective to real address translation (ERAT) table, etc.) used by the hardware accelerator or another processor, etc.

FIG. 1 illustrates an example hardware acceleration system 100 in which computing system (or chip) 110 is configured to interface with one or more external (e.g., off-chip) hardware accelerators 156, according to one embodiment. As shown, computing system 110 includes one or more central processing units (CPUs) (or processing cores) 1-N 105, one or more (L2) caches 126, one or more coherent accelerator processor proxies (CAPPs) 146, one or more peripheral component interconnect (PCI) adapters 150, one or more PCI host bridges 152, and one or more accelerator host bridges 1-K 154. The CPUs 105, caches 126, CAPPs 146, PCI host bridges 152, accelerator host bridges 154, and memory 140 may each be connected via an interconnect bus 117.

Memory 140 may represent random access memory (RAM) devices that include the main storage for computing system 110, as well as supplemental levels of memory, e.g., cache memories, non-volatile or backup memories (e.g., programmable or flash memories), read-only memories, and the like. In some embodiments, the computing system 110 may include a memory controller (not shown) that is used to interface with memory 140. In one embodiment, memory 140 may include memory storage physically located in computing system 110 or another computing device coupled to computing system 110.

The computing system 110 can be configured to interface with one or more hardware accelerators 156 (e.g., via bus 130) using accelerator host bridges 154. Accelerator host bridge 154 provides an interface between CPU 105 and hardware accelerator 156 that hardware accelerator 156 uses for memory accesses (e.g., read and/or write operations). In some cases, a hardware accelerator 156 may physically be keyed to a standard input/output interface, such as a PCI Express interface. Accelerator host bridge 154 generally includes logic that allows a hardware accelerator 156 to communicate with a CPU 105 via a CAPP 146. Each CAPP 146 may be configured to represent one or more hardware accelerators 156. Hardware accelerator(s) 156 can be configured to offload specific types of work (e.g., such as encryption, graphics processing, compression, etc.) from the on-chip CPUs 105. In general, each hardware accelerator 156 can be another computing system, FPGA, graphics processing unit (GPU), etc. The computing system 110 may also include an I/O device interface connecting I/O devices (e.g., keyboard, display, and mouse devices) to the computing system 110. Storage devices may be connected via one of the hardware accelerators 156 or PCI adapters 150.

Each CPU 105 includes address translation caches, such as translation lookaside buffer (TLB) 120 and effective to real address translation (ERAT) table 122. Each CPU 105 may include various registers, buffers, memories, and other units formed by integrated circuitry, and may operate according to reduced instruction set computing ("RISC") techniques. Each CPU 105 may also include local memory (not shown), e.g., such as L1 cache memory, etc., integrated within the CPU 105. Each cache 126 (e.g., L2 cache memory) may be local (or private) to its respective CPU (or processing core) 105. Further, although not shown, computing system 110 may include one or more other levels of cache (e.g., such as L3 cache memory) that is shared among all of the CPUs 105 via the bus 117.

The TLB 120 and ERAT table 122 of the CPU 105 can be used by the CPU 105 and/or hardware accelerator 156 to maintain recent translations of memory addresses. For instance, the TLB 120 may maintain recent translations of virtual addresses to real addresses. ERAT table 122 may maintain recent translations of effective addresses to real addresses. In some embodiments, CPU 105 may also include (not shown) a segment lookaside buffer (SLB) for maintaining recent translations of effective addresses to virtual addresses. In one embodiment, the TLB 120, ERAT table 122 and/or SLB may be included in a memory management unit (MMU). In one embodiment, the MMU and/or CPU(s) 105 may include a translation unit configured to perform translations from the program's address space to physical memory.

Each CPU 105 retrieves and executes programming instructions stored in the memory 140 as well as stores and retrieves application data residing in the storage devices. The bus 117 is used to transmit programming instructions and application data between the CPUs 105, CAPPs 146, PCI host bridges 152, accelerator host bridges 154, and memory 140. In one embodiment, CPU 105 is representative of the "POWER" microprocessor by IBM. Note that, in some embodiments, components of system 100 shown as on computing system 110 may be located off computing system 110, and components of system 100 shown as off computing system 110 may be located on computing system 110.

In many multiprocessor systems with distributed shared memory, it is important to ensure that the local caches are in sync. For example, in such systems, situations may arise in which multiple processors (and/or an accelerator) attempt to access the same data, in which case the cache line (associated with the data) can be moved from one processor to another processor. In such cases, multiprocessor systems generally employ a coherency protocol to maintain consistency between all the caches. One type of a coherency protocol is a snoop-based cache coherency protocol. Traditionally, snoop-based cache coherence is implemented in a bus-based system in which caches communicate with each other via a shared bus. As part of the snooping protocol, address broadcasts are sent to the snoopers, snoop responses are sent back (typically in order) to the initiating chip, and a combined snoop response broadcast is sent back to all of the snoopers. Based on the outcome of the negotiation for the cache line(s), the actual cache line(s) can then be moved to their respective destinations on the data bus.

In some cases, to maintain coherency, coherency protocols (e.g., such as snoop based coherency protocols) can mark the cache line as one of multiple states to keep track of the status of the cache line as it is moved from processor to processor. One example of a protocol used to maintain states of a cache line is the MESI protocol. In MESI, every cache line (in every cache) is marked with one of the four following states: Modified, Exclusive, Shared and Invalid. A cache line in the "modified" state generally means the cache line is present only in the current cache and the cache line has been modified from the value in main memory. When in the "modified" state, the cache typically is required to write the data back to main memory (e.g., to make the cache consistent). A cache line in the "exclusive" state generally means the cache line is present only in the current cache (e.g., only one cache is accessing the cache at a particular time). A cache line in the "shared" state generally means the cache line is present in multiple different caches. A cache line in the "invalid" state generally means the cache line is invalid (e.g., the cache line is not present in the cache). If multiple caches each have shared copies of a cache line, one of those caches may have the cache line in a "shared last" state. That cache could then be responsible for providing copies of that cache line to new requestors.

In computing systems that use an off-chip hardware accelerator 156 to offload specific types of work, the CAPP 146 is generally used to represent the hardware accelerator 156 in any snooping negotiations (e.g., with the CPUs 105) that take place on the bus 117. The CAPP 146 can enforce coherence in the caches 158 used by hardware accelerators 156 by monitoring coherency traffic (e.g., relating to cache coherence, page table coherence, segment table coherence, etc.) on the bus 117. However, as noted above, the CAPP 146 generally cannot represent a hardware accelerator(s) 156 in negotiations on the bus 117 until the hardware accelerator(s) 156 is ready to actually perform a workload (e.g., the hardware accelerator is initialized and/or warmed up). These situations can lead to increased latency experienced by the CPUs 105 that have requested the hardware accelerators 156 to perform a workload, and in turn, reduce overall system performance.

Embodiments presented herein provide techniques that can be used for faster loading of data for accelerators 156. Specifically, certain embodiments described herein modify the cache coherency protocol (e.g., MESI protocol) to improve performance for systems that use on-chip proxies to represent off-chip hardware accelerators.

For example, in one embodiment, a new "claimed" cache state can be added to the cache coherency protocol. The "claimed" cache state indicates that a cache line has been "claimed" (indicating ownership has changed) but that data (associated with the cache line) has not yet been moved to the new owner. The "claimed" cache state may include two sub states: a "claimed by someone else $(C_O)$" state and a "claimed by me $(C_M)$" state. The $C_O$ state can be used to describe the state of cache lines that are located in one cache (e.g., cache A), but that are owned by another cache (e.g., cache B). The $C_M$ state can be used to describe the state of cache directory entries (e.g., in directory 148) which are owned by one cache (e.g., cache B), but the cache lines themselves are still in another cache (e.g., cache A).

In one reference example, assume that one of the CPUs 105 requests (via a CAPP 146) a hardware accelerator 156 to perform an encryption workload, but the hardware accelerator 156 is not currently ready to perform the encryption workload (e.g., the hardware accelerator may not be initialized or warmed up, may be performing another workload, etc.). In this example, while the hardware accelerator 156 is in the process of initializing and/or warming up for the encryption workload, the CAPP 146 can be configured to negotiate (via snoop requests/responses) with the CPUs 105 on behalf of the hardware accelerator 156 for the data that will be needed by the hardware accelerator 156 for the encryption workload.

As the CAPP 146 gets permission to use the data, the CAPP 146 can mark the cache lines (associated with the data) with the "claimed" cache state to indicate that the data is "claimed" (and now owned) by the CAPP 146 on behalf of hardware accelerator 156, but that the data is still in its previous location (i.e., the data has not actually been moved to the hardware accelerator 156, as the hardware accelerator 156 is not ready to accept the data). More specifically, the CAPP 146 can mark the cache lines with the "$C_M$" state to indicate that it has "claimed" the cache line, but that the physical location of the cache line resides in another location (e.g., one of the caches 126, memory 140, etc.). At the same time, the cache line, in its original location, is marked with the $C_O$ state, to indicate that someone (e.g., CAPP 146) has claimed it, but the cache line remains in its original location. In this manner, when the hardware accelerator 156 is ready to accept the encryption data, the data can be loaded on the hardware accelerator 156 without the CAPP 146 having to negotiate for the data at load time, which can substantially reduce the amount of time associated with loading data into the hardware accelerator.

Embodiments also provide techniques that can be used to pre-emptively warm up address translation for another entity (e.g., CPU 105, hardware accelerator 156, etc.), before the entity needs to use the address translation.

For example, the CPUs 105 and/or hardware accelerators 156 may include address translation and protection services that translate memory addresses from the programming space to the hardware space, and keep programs from accessing memory locations that they are not supposed to access. As these services generally take a long time to perform, they are typically performed once and the associated translations are stored in an address translation cache, such as a TLB, SLB, ERAT table, etc.

However, in many cases, the CPUs 105 and/or hardware accelerators 156 may not be able to perform the address translation and protection services until the CPUs 105 and/or hardware accelerators 156 are initialized and/or ready to perform the next workload. This delay can significantly increase the latency of the computing system 110, and in turn reduce overall system performance.

Accordingly, in some embodiments, while a given CPU 105 (e.g., CPU 1) is waiting for another unit (e.g., another CPU 105 (CPU 3) or hardware accelerator 156) to be initialized and/or ready to perform a requested workload, CPU 1 can be configured to warm up the address translation that will be used by the other unit. For example, the CPU 1 can be configured to determine if the other unit has authority to access the data associated with the requested workload, and if the other unit does have authority, CPU 1 can requests the address translation hardware (e.g., MMU) on the computing system 110 to begin translating the memory addresses associated with the data for the requested workload, and store the translations in the other unit's translation cache. In this manner, once the other unit is ready to perform the requested workload, the other unit can begin using the address translations without having to warm-up the address translation caches.

Figure 2:
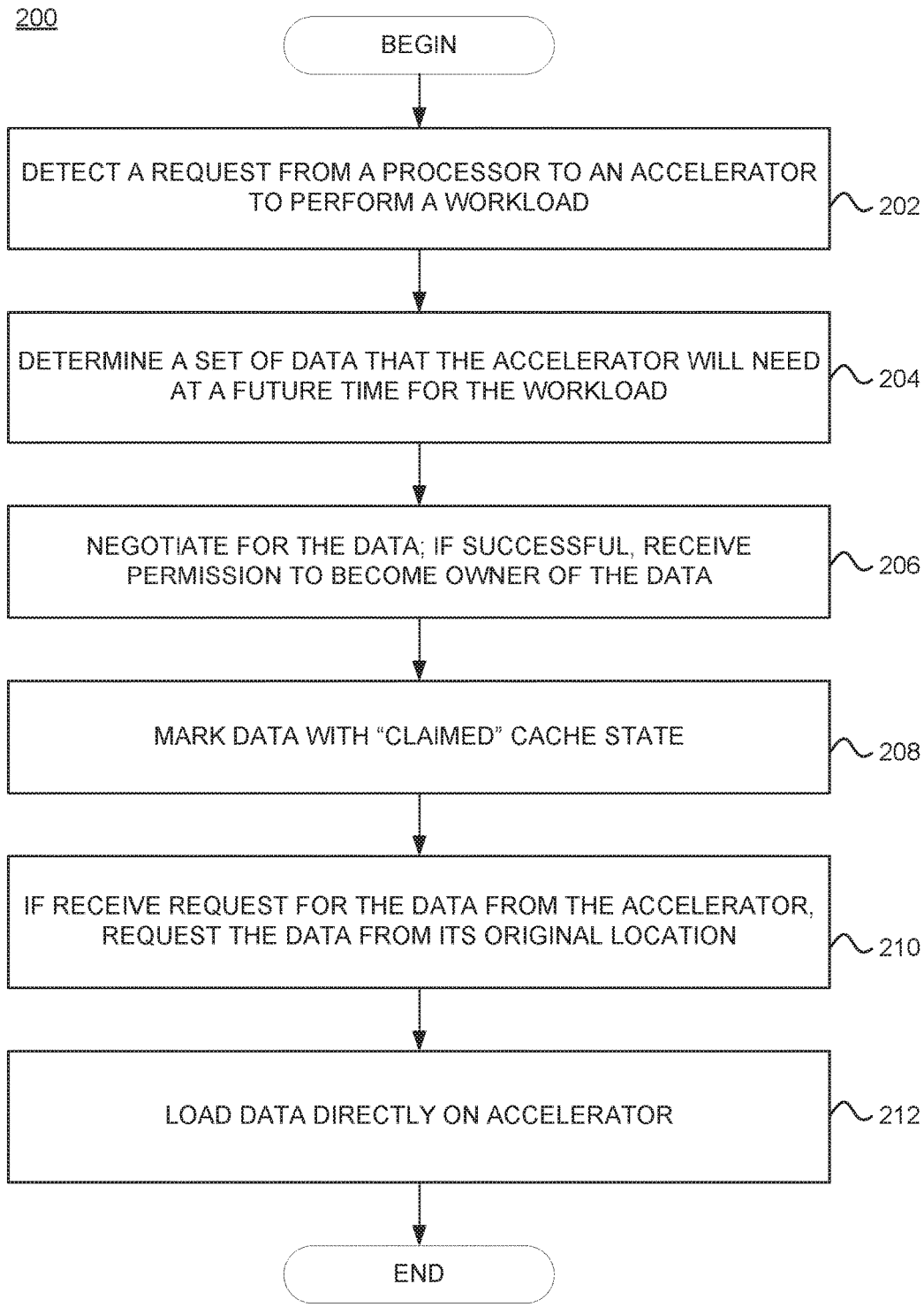
FIG. 2 is a flow chart illustrating a method for faster loading of data for a hardware accelerator, according to one embodiment.

FIG. 2 is a flow chart illustrating a method 200 for faster loading of data for a hardware accelerator (e.g., hardware accelerator 156), according to one embodiment. The method 200 can be performed by an accelerator proxy unit (e.g., one of CAPPs 146) representing the hardware accelerator in a computing system (e.g., computing system 110).

As shown, the method 200 begins at block 202, where the accelerator proxy unit detects a request from one of CPUs 105 for a hardware accelerator (e.g., hardware accelerator 156) represented by the accelerator proxy unit to perform a workload (e.g., such as encryption, graphics processing, compression, etc.). In some cases, the accelerator proxy unit can receive the request on behalf of the hardware accelerator.

At block 204, the accelerator proxy unit determines a set of data that will be needed by a hardware accelerator (e.g., hardware accelerator 156) for the requested workload (e.g., at a future time). In one embodiment, the accelerator proxy unit can determine the set of data for the requested workload based on a "work element" block in system memory that is used by CPUs 105 to request workloads. The "work element" block may include a list of the addresses of the cache lines associated with the data that will be needed by the hardware accelerator. The accelerator proxy unit can be given a pointer to the "work element" and can use the list in the "work element" to speculatively negotiate for the data and mark the data with the "claimed" cache state. For example, in some cases, the hardware accelerator may not be ready (e.g., at the time the hardware accelerator is requested to perform the workload) for the set of data. That is, as noted, the hardware accelerator may not have completed one or more actions associated with initializing and/or warming up, the hardware accelerator may be in the process of performing another workload, the hardware accelerator may not yet be configured to perform the requested workload, etc.

At block 206, the accelerator proxy unit speculatively negotiates for the data associated with the requested workload using the system bus 117. For example, the accelerator proxy unit may perform snooping in accordance with a snoop-based coherency protocol on bus 117 to request the set of data. Based on the "work element," the accelerator proxy unit may locate the data in system memory (e.g., memory 140) or in some on-chip cache (e.g., cache 126). Assuming the negotiation is successful, the accelerator proxy unit is given permission to become the new owner of at least some of the data (block 206). In some embodiments, the accelerator proxy unit may perform blocks 204-206, after determining that the hardware accelerator is not ready to perform the requested workload.

At block 208, accelerator proxy unit marks the data with the "claimed" cache state. For example, the accelerator proxy unit can make an entry in its cache directory (e.g., cache directory 148) with the $C_M$ state, so that it knows that it now owns the cache line(s) associated with the set of data. However, the line(s) itself still resides in its original location. In some embodiments, the accelerator proxy unit may save a tag (e.g., in the respective entry of its cache directory for the cache line) that indicates where the data is actually located. At the same time, the cache line(s), in its original location, is marked with the $C_O$ state to indicate that someone (e.g., the accelerator proxy unit) has claimed the cache line(s). In some embodiments, the cache line(s) can be marked in the $C_O$ state by the owner of the cache line(s) or by the accelerator proxy unit that has claimed it. In some embodiments, once the cache line(s) is marked with the "claimed" state, the accelerator proxy unit becomes responsible to answer any requests for the cache line(s), even though the cache line(s) is still in system memory or in another cache.

At block 210, assuming the hardware accelerator is ready to accept data, the hardware accelerator can request the cache line(s) from accelerator proxy unit. Based on this request, the accelerator proxy unit will then request the cache line(s) from its original location (e.g., using the saved tag in its cache directory). In one embodiment, the accelerator proxy unit can request the cache line(s) using a data message command or a processor bus command that does not require or employ snooping.

At block 212, a data-only transfer is used to move the cache line(s) directly from its original location into the hardware accelerator's cache (e.g., cache 158). At this point, the state of the cache line(s) in the original location can be downgraded from $C_O$ to I or S. At the same time, the state of the directory entry for the cache line(s) in the accelerator proxy unit can be upgraded from $C_M$ to E or "shared last."

The accelerator proxy unit may proceed to repeat one or more of the above blocks in method 200 to speculatively negotiate and claim the data for the hardware accelerator. For example, while the accelerator is not ready to accept data, the accelerator proxy unit may continue to repeat blocks 204 to 208 to claim additional data for the accelerator (e.g., if there is any remaining data associated with the requested workload (or for additional requested workloads)). Additionally, when the accelerator is ready to accept data, the accelerator proxy unit may continue to repeat blocks 210 to 212 to move the claimed data onto the accelerator (e.g., until there is no more remaining "claimed" data).

Using the "claimed" cache state in this manner to speculatively claim data (e.g., before the data can be moved) allows for the data to be loaded onto the hardware accelerator as soon as the hardware accelerator is ready for it, reducing the amount of time it takes to load data for the hardware accelerator. For example, in computer systems that employ a bus snooping mechanism for enforcing cache coherency, the coherency snooping can occur many clock cycles before the actual data movement. Thus, by enabling the coherency snooping to be done early, the accelerator may not have to wait for the coherency negotiations when it is ready to take the data. Additionally, or alternatively, the new "claimed" cache state can be used to warm up the ERAT/TLB in the accelerator proxy unit, which can reduce the time required for subsequent cache line accesses.

Figure 3:
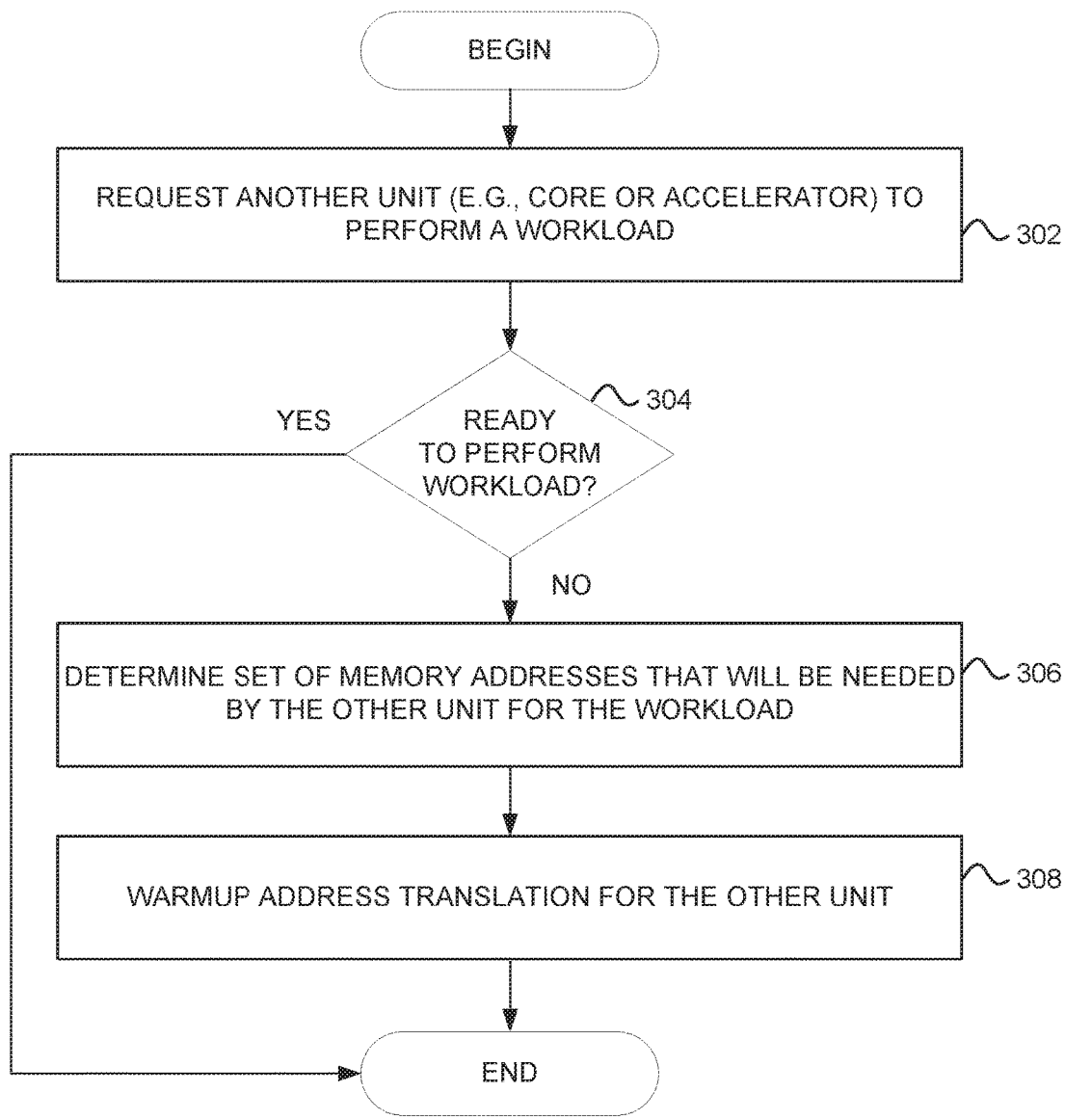
FIG. 3 is a flow chart illustrating another method for faster loading of data for a processor and/or hardware accelerator, according to one embodiment.

FIG. 3 is a flow chart illustrating a method 300 for faster loading of data for a hardware accelerator (e.g., hardware accelerator 156) and/or processor (e.g., CPU 105), according to one embodiment. The method 300 can be performed by a processing unit (e.g., CPU 105) on the computing system (e.g., computing system 110).

As shown, the method 300 begins at block 302, where the processing unit requests another unit to perform a workload. The other unit may be another processing unit (e.g., CPU 105) located on the computing system or a hardware accelerator (e.g., hardware accelerator 156) located off the computing system.

At block 304, the processing unit determines whether the other unit is ready to perform the workload (e.g., at the time of the request). For example, there may be cases in which the other unit may not be ready to perform the workload. Such cases can include situations in which the other unit may not be initialized and/or warmed up, the other unit may be performing another workload, etc. If the processing unit determines that the other unit is ready to perform the workload, the method 300 ends. On the other hand, if the other unit is not yet ready to perform the workload, the processing unit determines a set of memory addresses that will needed by the other unit (e.g., to perform the requested workload). For example, in one embodiment, the processing unit can determine the addresses of data lines that will be needed by the other unit based on a "work element" block in system memory. The "work element" block may include a list of the data addresses that will be needed by the other unit for the given workload. The processing unit can be given a pointer to the "work element" and can use the "work element" to request that address translations be performed for those addresses. In addition, the processing unit can be given context information (e.g., the PCI ID, process ID, etc.) regarding the memory addresses needed by the other unit. In some embodiments, the processing unit can request this context information from a hypervisor (not shown) in the computing system 110.

Once the set of addresses is determined, the processing unit, at block 308, can warmup the address translation hardware (e.g., TLB, ERAT, etc.) for the other unit (which may not be ready for the address translation). In one embodiment, the processing unit can be configured to use a new processor bus command that allows a processing unit to pre-emptively warm up the address translation cache for another unit. For example, some computer systems may allow a processing unit to use processor bus commands to warmup the processing unit's own address translation cache (e.g., TLB, ERAT, etc.). Compared to these traditional systems, embodiments herein enable the processing unit to use a new processor bus command that enables the processing unit to warm up the address translation for another unit. For example, the processor bus command can be a modified version of a "touch" command (e.g., data cache block touch (dcbt) instruction) that enables the processing unit to vicariously call it for another unit.

Once called, the address translation hardware for the other unit can begin translating the determined addresses and placing the translations into the address translation cache for the other unit. Once the other unit is ready to begin performing the workload, the other unit can access the translations in the translation cache, without having to spend time performing the address translations. As such, the amount of time it takes to load data into the other unit can be significantly reduced.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may request CPUs 105 and/or hardware accelerators 156 to perform different workloads or access related data available in the cloud. For example, the CAPP 146 could execute on a computing system in the cloud and can represent a hardware accelerator 156 interfaced with the computing system. In such a case, the CAPP 146 could be configured to use the above described techniques to reduce the amount of time it takes to load data onto the hardware accelerator 156. Similarly, one or more CPUs 105 could execute on a computing system in the cloud and can use the above described techniques to reduce the amount of time it takes to load data onto another CPU 105 and/or hardware accelerator 156. The hardware accelerator 156 and/or computing system 110 can perform one or more workloads and store workload results at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for loading data on an accelerator, the method comprising:
   upon determining that the accelerator is not ready to perform a workload, identifying data associated with performing the workload and negotiating for the data on behalf of the accelerator;
   after negotiating for the data, marking a cache directory entry associated with the data with a first state indicating that the accelerator has obtained ownership of the data but does not have possession of the data; and
   upon receiving an indication that the accelerator is ready to accept the data for the workload, moving the data from a previous owner that has possession of the data to the accelerator, comprising:
      requesting the data from the previous owner without performing snooping;
      loading the data from a location at the previous owner into a cache at the accelerator; and
      after loading the data from the location at the previous owner into the cache at the accelerator:
         marking the location at the previous owner with a second state indicating one of invalid data or shared data; and
         marking the cache directory entry with a third state indicating one of exclusive data or shared last data.

2. The method of claim 1, further comprising, after negotiating for the data, marking a location of the data with a fourth state indicating that the accelerator has obtained ownership of the data but that the previous owner retains possession of the data.

3. The method of claim 1, wherein determining that the accelerator is not ready to perform the workload comprises determining that the accelerator is initializing, warming up, or performing another workload.

4. The method of claim 1, wherein negotiating for the data comprises:
   sending snoop requests to one or more processing units for the data; and
   receiving responses from the one or more processing units indicating a status of the data.

5. The method of claim 1, further comprising handling requests for the data after marking the cache directory entry with the first state.

6. A system, comprising:
   a processor;
   an accelerator; and
   a memory storing a program, which, when executed on the processor, perform an operation for loading data on the accelerator, the operation comprising:
      upon determining that the accelerator is not ready to perform a workload, identifying data associated with performing the workload and negotiating for the data on behalf of the accelerator;

after negotiating for the data, marking a cache directory entry associated with the data with a first state indicating that the accelerator has obtained ownership of the data but does not have possession of the data; and upon receiving an indication that the accelerator is ready to accept the data for the workload, moving the data from a previous owner that has possession of the data to the accelerator, comprising:
- requesting the data from the previous owner without performing snooping;
- loading the data from a location at the previous owner into a cache at the accelerator; and
- after loading the data from the location at the previous owner into the cache at the accelerator:
  - marking the location at the previous owner with a second state indicating one of invalid data or shared data; and
  - marking the cache directory entry with a third state indicating one of exclusive data or shared last data.

7. The system of claim 6, the operation further comprising, after negotiating for the data, marking a location of the data with a fourth state indicating that the accelerator has obtained ownership of the data but that the previous owner retains possession of the data.

8. The system of claim 6, wherein determining that the accelerator is not ready to perform the workload comprises determining that the accelerator is initializing, warming up, or performing another workload.

9. The system of claim 6, wherein negotiating for the data comprises:
- sending snoop requests to one or more processing units for the data; and
- receiving responses from the one or more processing units indicating a status of the data.

10. The system of claim 6, the operation further comprising handling requests for the data after marking the cache directory entry with the first state.

11. A computer program product, comprising a non-transitory computer-readable storage medium having computer readable program code embodied therewith, the computer readable program code executable by one or more computer processors to perform an operation for loading data on an accelerator, comprising:
- upon determining that the accelerator is not ready to perform a workload, identifying data associated with performing the workload and negotiating for the data on behalf of the accelerator;
- after negotiating for the data, marking a cache directory entry associated with the data with a first state indicating that the accelerator has obtained ownership of the data but does not have possession of the data; and
- upon receiving an indication that the accelerator is ready to accept the data for the workload, moving the data from a previous owner that has possession of the data to the accelerator, comprising:
  - requesting the data from the previous owner without performing snooping;
  - loading the data from a location at the previous owner into a cache at the accelerator; and
  - after loading the data from the location at the previous owner into the cache at the accelerator:
    - marking the location at the previous owner with a second state indicating one of invalid data or shared data; and
    - marking the cache directory entry with a third state indicating one of exclusive data or shared last data.

12. The computer program product of claim 11, the operation further comprising, after negotiating for the data, marking a location of the data with a fourth state indicating that the accelerator has obtained ownership of the data but that the previous owner retains possession of the data.

13. The computer program product of claim 11, wherein determining that the accelerator is not ready to perform the workload comprises determining that the accelerator is initializing, warming up, or performing another workload.

14. The computer program product of claim 11, wherein negotiating for the data comprises:
- sending snoop requests to one or more processing units for the data; and
- receiving responses from the one or more processing units indicating a status of the data.

15. The computer program product of claim 11, the operation further comprising handling requests for the data after marking the cache directory entry with the first state.

\* \* \* \* \*